United States Patent [19]

Larson

[11] 4,052,607

[45] Oct. 4, 1977

[54] VERSATILE LIGHT DIFFUSER

[76] Inventor: Raymond George Larson, 9731 Rainier Circle, Huntington Beach, Calif. 92646

[21] Appl. No.: 718,057

[22] Filed: Aug. 26, 1976

[51] Int. Cl.² .............................................. G03B 15/02
[52] U.S. Cl. ....................................... 362/18; 362/320
[58] Field of Search ...................... 240/1.3, 103 R, 2 C, 240/1 R, 108, 46.07, 46.33

[56] References Cited

U.S. PATENT DOCUMENTS

| 1,225,261 | 5/1917 | McCandless | 240/1.3 |
| 2,205,860 | 6/1940 | Olds | 240/1.3 |
| 3,821,542 | 6/1974 | Kitamura | 240/2 C |
| 3,851,164 | 11/1974 | Intrator | 240/103 R |
| 3,873,821 | 3/1975 | Larson | 240/1.3 X |

Primary Examiner—Richard L. Moses

Attorney, Agent, or Firm—Mahoney, Schick & Cislo

[57] ABSTRACT

A uniquely configured and constructed light diffuser device which is versatile in the sense that it is easily associated with various light sources ubiquitously found in the photographic field wherein the diffuser has a myriad of light diffusing and reflecting capabilities because of the ability to diffuse or reflect light selectively. The device is easily handled and positionable into an erect or collapsed position for ease of transport and association with a light source. The device utilizes diffusing segments or panels which are alterable independent of each other in order to vary lighting patterns associated with photographic objects. The device is lightweight and collapsible for ease of asportation and finds unique applicability in the photography field wherein it is desired to achieve and attain various lighting characteristics.

45 Claims, 20 Drawing Figures

VERSATILE LIGHT DIFFUSER

BACKGROUND OF THE INVENTION

In the prior art, various light diffusing devices have been suggested in the art of photography but most of these devices have either comprised stationary devices of a non-collapsible or foldable type, screens or various sophisticated and expensive devices which are cumbersome to handle in the sense of proper placement thereof with a lighting source and difficult to transport.

Most of the prior art light diffusing and light directing devices are not easily associated with the lighting source itself and thus presents some difficulty in handling separate lighting sources and separate light diffuser and directors. The prior art light diffusing devices also lack the versatility of being able to selectively vary the light intensity in a manner desired by the photographer. Because of these and other limitations, the light diffusing and directing devices of the prior art, of the type primarily utilized in photography, are less than fulfilling in that they are limited in their scope of application and do not meet the wide variety of lighting needs.

With the herein disclosed devices, a photographic light diffusing and light directing device is disclosed which is easily collapsible from the erect state and easily erectible from the collapsed state wherein the device has a specific configuration for association with a variety of lighting sources and wherein through the association greater stability of light diffuser and light director with lighting source is obtained. The devices of the invention also permit various selected lighting effects to be easily obtained and the various embodiments of the devices permit specific selective lighting effects for photographic purposes.

The devices of the invention are relatively unsophisticated in the mechanical sense, thereby insuring longevity of usage, are easy to operate and employ, and because of lightweight and the collapsible foldable nature, are easily carried from place to place should the need arise.

OBJECTS AND SUMMARY OF THE INVENTION

It is an object of the invention to provide a photographic light diffusing and directing device which is easily associated with a light source.

It is another object of the invention to provide a photographic light diffusing and light directing device which is lightweight, collapsible and easily asportable.

It is still another object of the invention to provide a photographic light diffusing and directing device wherein a myriad of lighting effects is obtainable.

It is still another still further important object of the invention to provide a photographic light diffusing and light directing device wherein a support structure on which the light diffusing and light directing surfaces are supported is collapsible into a compact unit.

It is still another, more important specific object of the invention to provide a light diffusing and directing device utilizing fabric elements which are disassociable with a light source in order to vary lighting effects.

It is still another and more important even further specific object of the invention to provide a photographic light diffusing and light directing device for association with a light source in a facile manner.

It is still another more important and even more specific object of the invention to provide a light diffusing device which is versatile in its combination with a photographic light source wherein the device is associated with the light source in a unique and stable manner.

It is still another even more specific and further object of the invention to provide a light diffusing device for association with a photographic light source wherein the device employs conformable segments which are collapsible in order to vary the degree of light emitted from the light source and directed on the photographic object.

It is still an even further and even more specific object of the invention to provide a device for association with photography lighting sources wherein the amount and direction of the light may be diffused and/or directed in order to achieve a selected photographic lighting effect.

Basically, in an exemplary embodiment, the invention is directed to a light diffuser and light directing device comprising a first frame support member adapted for association with a light source and including a second frame support member spaced from said first frame support member and comprising a plurality of collapsible rays extending from a central hub means for movement into a collapsed position and an erect position and wherein a light diffusing member defines one or more light diffusing segments detachably supported from and forming at least a front wall and at least one side wall between the first and second frame support members. The termini of the plurality of rays opposite said hub means are adapted to receive the front wall forming segment of said light diffusing member outwardly from a light source with which said light diffuser is adapted to be associated.

In another embodiment of the invention, a light directing member is adapted for association with the light diffusing member and comprises a plurality of shutter-like elements whereby light may be diffused and directed onto a photographic object in a selective manner in order to obtain various lighting effects.

These and other objects of the invention will become apparent as the description proceeds herein when taken in conjunction with the drawings and hereinafter following commentary.

DESCRIPTION OF THE BEST EMBODIMENTS CONTEMPLATED

Referring to the drawings wherein like numerals of reference will designate like elements throughout, the device 2 of the invention is shown as being illustrated with a self-contained light source 4 of the type that is so constructed so as to centrally mount a reflector, light diffuser or lighting apparatus and is of the type illustrated in U.S. Pat. No. 3,870,874 to Larson and receives the device 2 in secure relationship by means of the extending, elongate rod 6 which is centrally received of the light source device 4 and rigidly held by means of thumbscrew 8. The light diffusing and light directing device 2, comprises a first frame support member 10 (FIGS. 3 and 4) rectangular in shape and being of light weight extruded aluminum or the like, having bar pieces 12 secured to cross pieces 14 by means of threaded screws 16 but which also can be welded, brazed or otherwise secured to form a rigid, rectangular member wherein the bars 12 are provided with opposed threaded holes or apertures 18 to receive thumbscrews 20 for purposes that will become apparent.

One of the cross bars 14 is also provided with a threaded aperture or bore 22 to also receive thumbscrew 20. The exterior housing 24 of light source 4 may be provided with grooves, channels or holes 26 so that the first support frame member 10 may be rigidly secured to the housing 24 by means of the thumbscrews 20 frictionally engaging the holes, slots or other recess provided to retain the device 2, in conjunction with the elongate rod 6, in secure, rigid relationship to light source 4.

The intersection of the cross bars 12 and braces 14 are provided with pins 28 of projecting nature so as to be able to receive and frictionally retain thereon, the conformable segments of the diffuser 2 as will become apparent.

Figure 16:
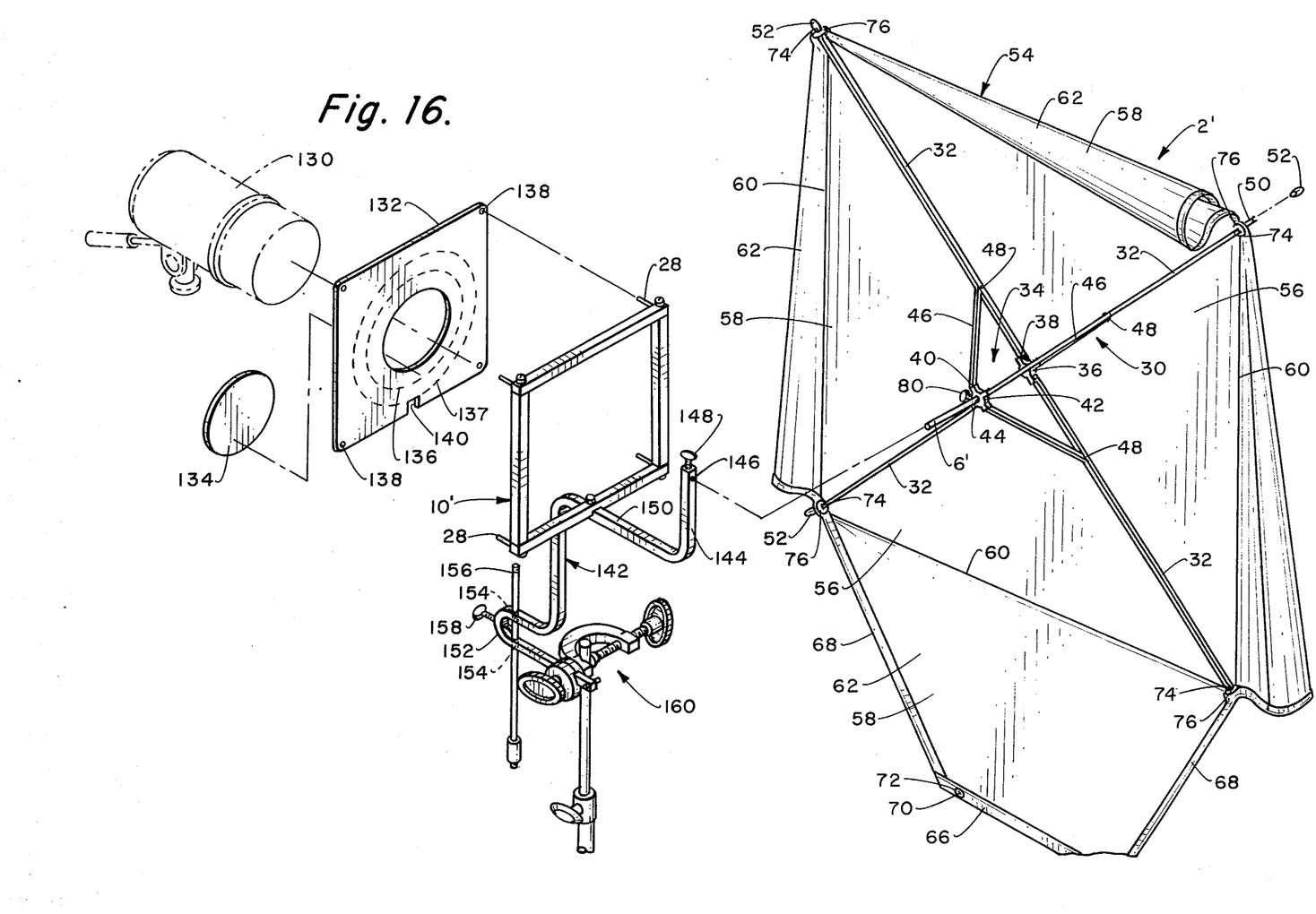
FIG. 16 is an exploded view illustrating the elements of construction making up the device of the invention in conjunction with a support means and light template for association with still another light source.
Figure 18:
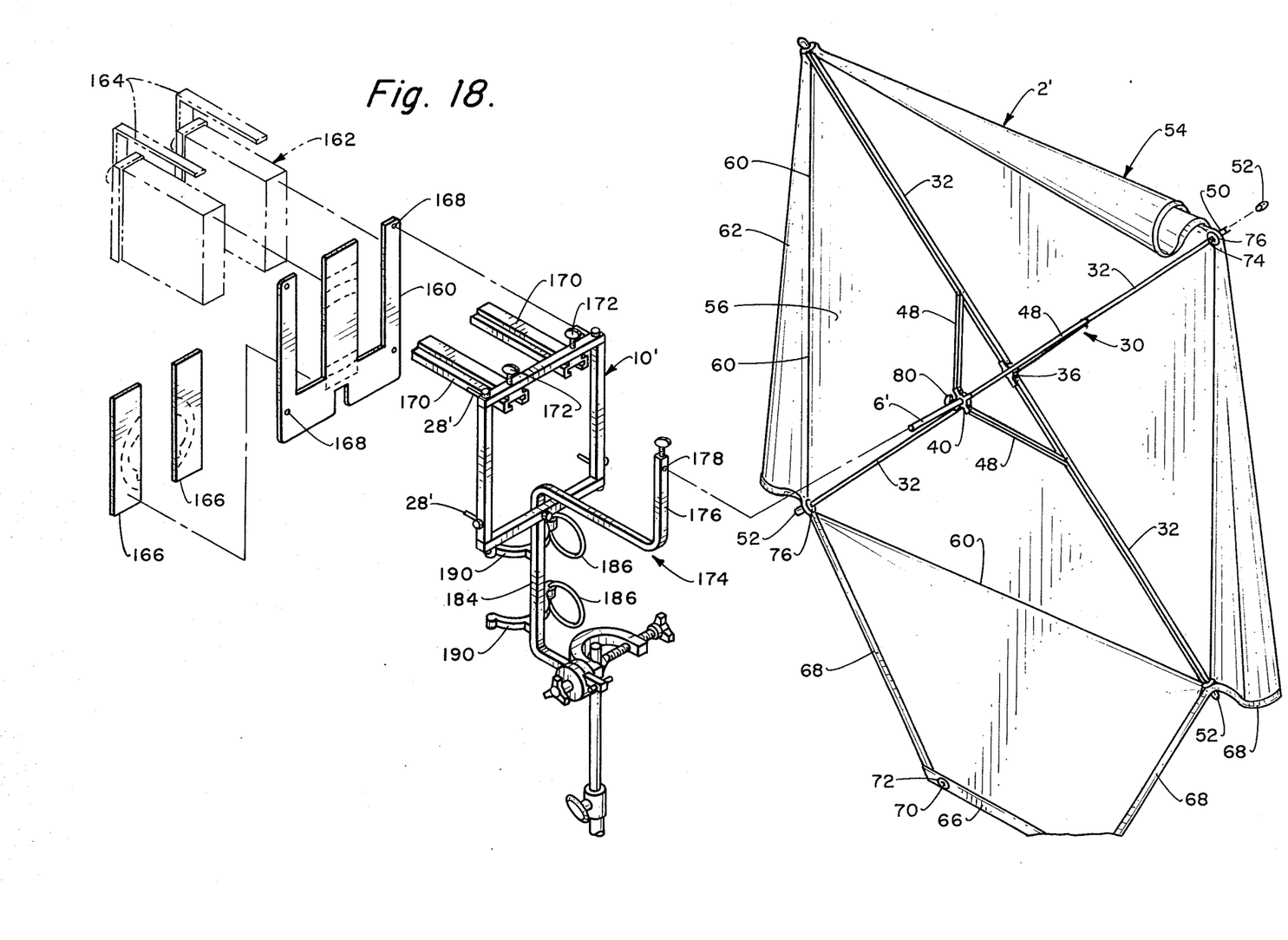
FIG. 18 is an exploded view illustrating the device of the invention in conjunction with another alternative support structure for association with still another light source.

A second frame support member 30 comprises a plurality of rays 32, in this instance four, in association with a central hub means 34 for movement into a collapsed or erect position. This structure is best seen in FIGS. 16 and 18. Hub means 34 comprises a first hub 36 having a plurality of radially spaced projections 38 and being integrally constructed of metal and having the elongate rod 6 securely fastened thereto by means of welding, riveting or the like. Each of the rays 32 are pivotally attached to each of the projections 38 by means of rivets and spaced from first hub 36 is second hub 40 which is provided with an equal number of spaced projections 42 and wherein the hub 40 is provided with a central bore 44 so that the hub 40 is slideably disposed on the elongate rod 6.

Figure 1:
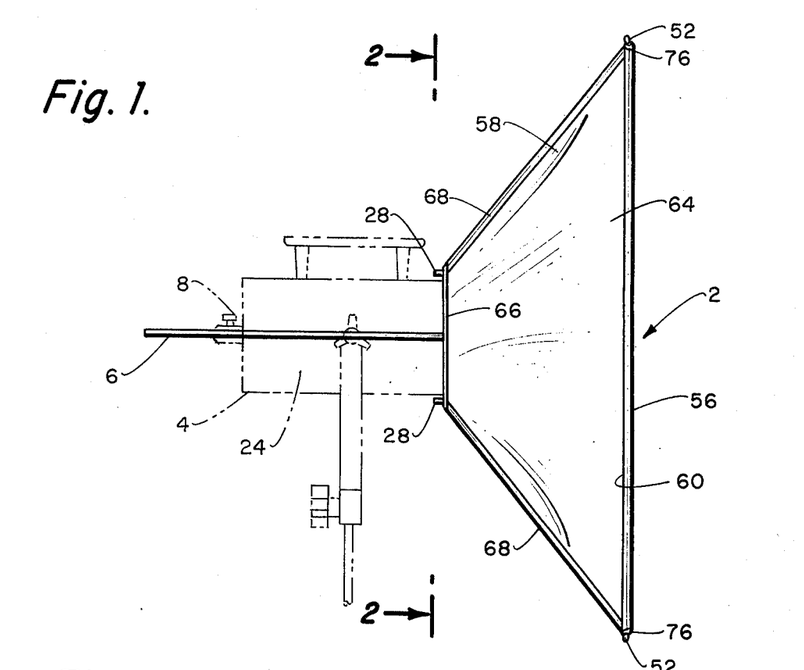
FIG. 1 is a side view of the device of this invention associated with a photographic lighting source being shown in phantom line.

Pivotally secured to each of the projections 42 of hub 40 are brace supports 46, the opposed end being also pivotally secured to the rays 32 by means of rivets 48. The length of elongate rod 6, for example, is sufficiently long so as to be able to be received through the photographic device as illustrated in FIG. 1. As thus described, it is obvious that the support structure is collapsible so as to be able to assume the state illustrated in FIG. 11. Each of the rays 32 are channel shaped and are rectangular in cross-section and the unattached termini 50 are notched or the like, so as to be able to receive grommets or covers 52 to retain the light diffusing and/or light directing element of the device 2 which will now be explained in detail.

The light diffusing element 54 of device 2 comprises a first rectangularly or square shaped panel 56 of translucent or opaque fabric having secured thereto a plurality of truncated-triangular shaped conformable segments 58 secured along the junctures 60 by means of sewing or the like to front panel 56. Each of the segments 58 are provided with an interior surface 62 which is light reflective, whereas the exterior surface 64 is light absorbtive and thus, each of the panels 58 may comprise a single ply of fabric or, in this instance, a double ply of fabric, having different light absorption and reflective qualities.

Figure 2:
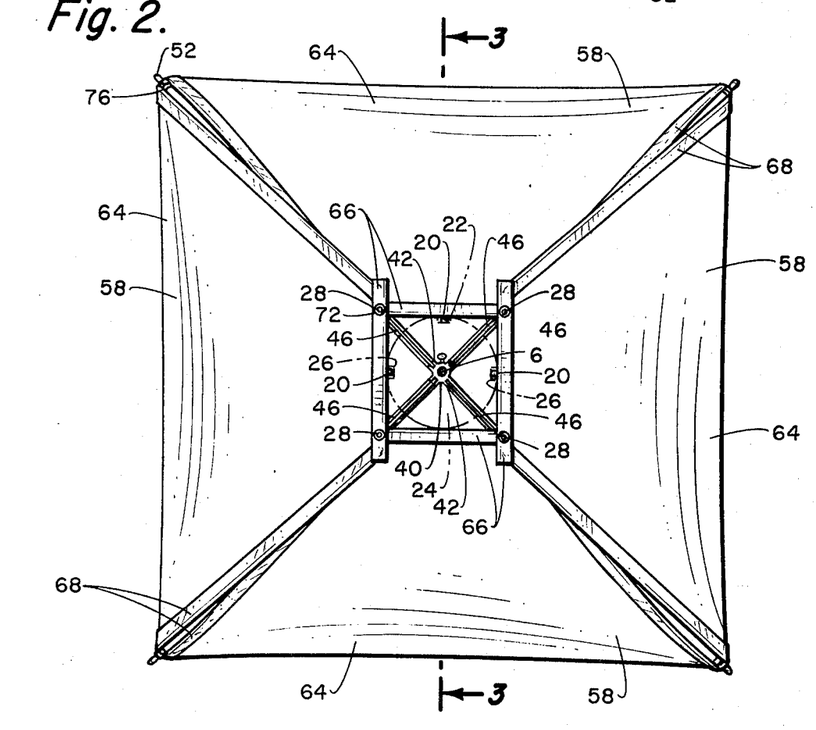
FIG. 2 is a view taken along the line 2—2 of FIG. 1.

Each of the segments 58 along the short edge 66 and long edge 68 are provided with a reinforcing border which not only acts to secure the two plies of material together, but also acts to provide reinforcement for apertures 70 which are positioned at the extremities of each of the short edges 66 of segments 58, which apertures are reinforced by means of metal reinforcing rings 72. Four spaced apertures 74 are positioned along the juncture line 60 between front segment 56 and side segments or panels 58 and also are reinforced with reinforcing rings 76 so that the light diffusing element 54 may be positioned as illustrated in FIG. 16 and specifically on the notched ends of rays 32 with the caps 52 placed thereover to prevent disassociation of the light diffusing element 54 from the support structure of device 2. The holes 70 disposed in the short edges 66 of the panels 58 are secured to the four pins or posts 28 carried on the first support member 10. When the device 2 is in the erected state as shown in FIGS. 1 and 2 and is secured to a photographic lighting source 4, and more specifically, the housing 24 thereof, a photographic diffuser is provided which channels all of the light through the front or opaque panel 56 of device 2 when all of the side wall or panel segments 58 are positioned as illustrated in FIG. 2.

Figures 3, 4, 5, 6, 7:
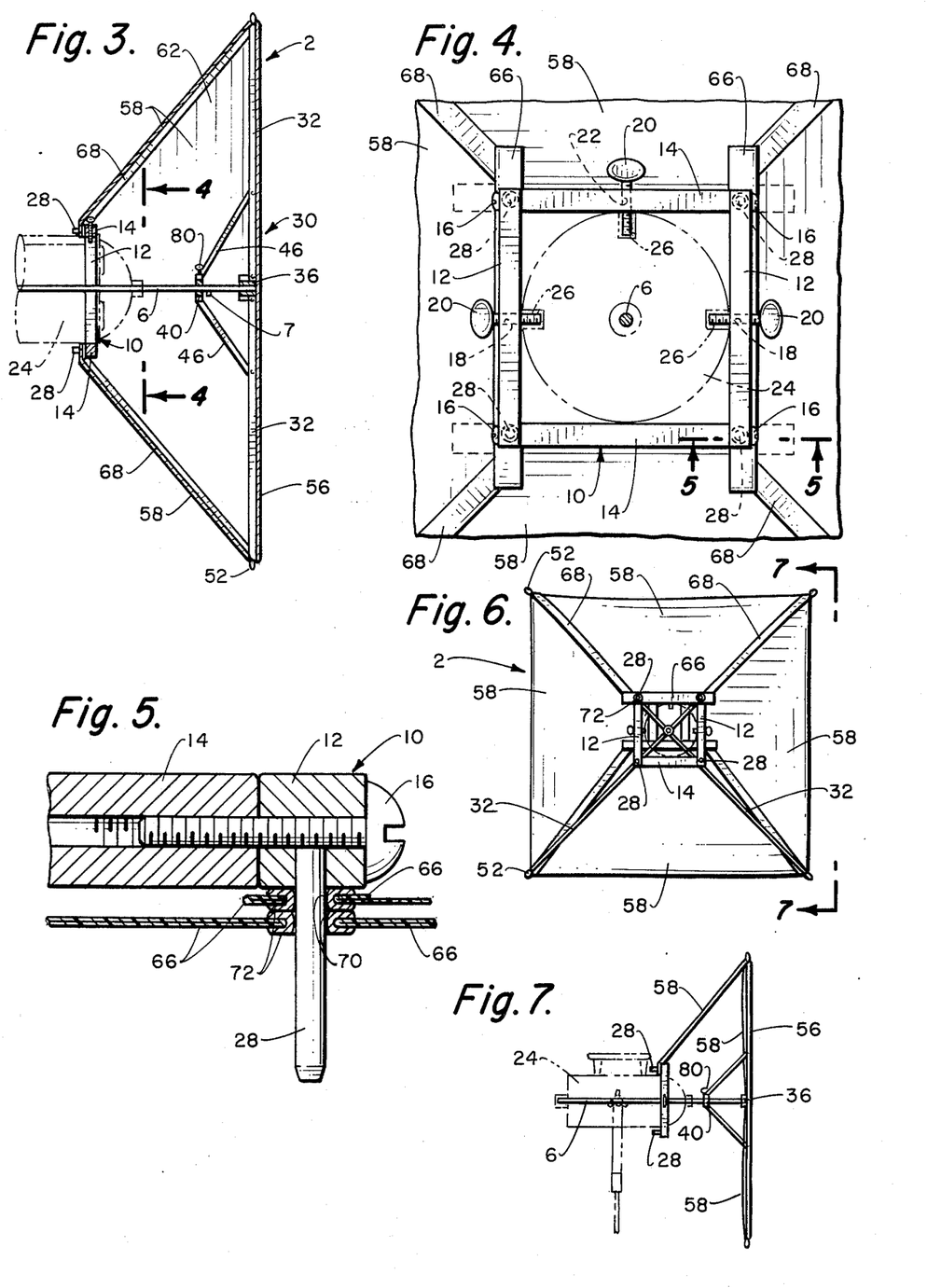
FIG. 3 is a view taken along the line 3—3 of FIG. 2.
FIG. 4 is a view taken along the line 4—4 of FIG. 3.
FIG. 5 is an enlarged, fragmented view taken along the line 5—5 of FIG. 4.
FIG. 6 is a view of the device similar to that illustrated in FIG. 2 but depicting the absence of several of the light directing and diffusing segments.
FIG. 7 is a view taken along the line 7—7 of FIG. 6 with the photographic lighting source being shown in phantom.
Figure 8:
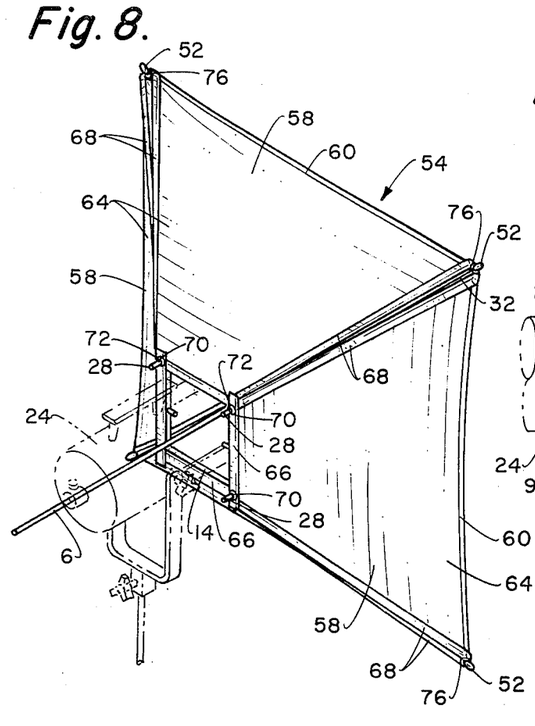
FIG. 8 is a perspective view of the device illustrated in FIG. 1.

In order to vary the quantity and quality of light being transmitted through opaque front wall 56 of light diffuser 54, the side panels 58 may be disengaged from the pins 28 and folded inwardly as illustrated in FIGS. 6 and 7 in order to achieve unique lighting effects on a photographic subject. Thus, referring to FIG. 6, the device 2 would merely have in position on the pins 28, the upper side wall panel or segment 58, whereas the remaining segments would be folded inwardly, thereby allowing for different light patterns to be projected through and around the front panel 56. To disassociate the device 2 from the light source 4, one would merely unscrew the thumbscrews 20 of first frame member 10, unloosen the retaining screw 8 in friction contact with the elongate rod 6, fold the panels inwardly as shown in FIG. 7, including the one panel shown in the erected position, loosen the thumbscrew 80, which is carried in a threaded bore of the hub 40 and engages the elongate rod 6, to thereby allow total collapse of the device 2 into the position illustrated in FIG. 11.

Figure 9:
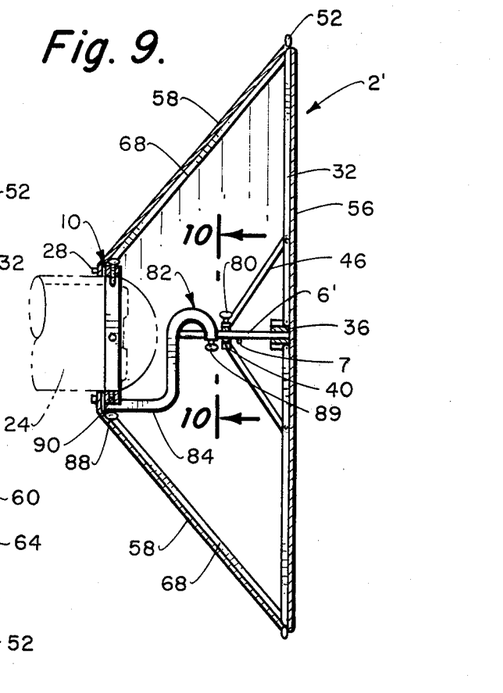
FIG. 9 is a cross-sectional, elevational view of an alternative embodiment of the device illustrating its association with a light source different than that previously shown in the drawings, the light source being partially illustrated in phantom.
Figure 10:
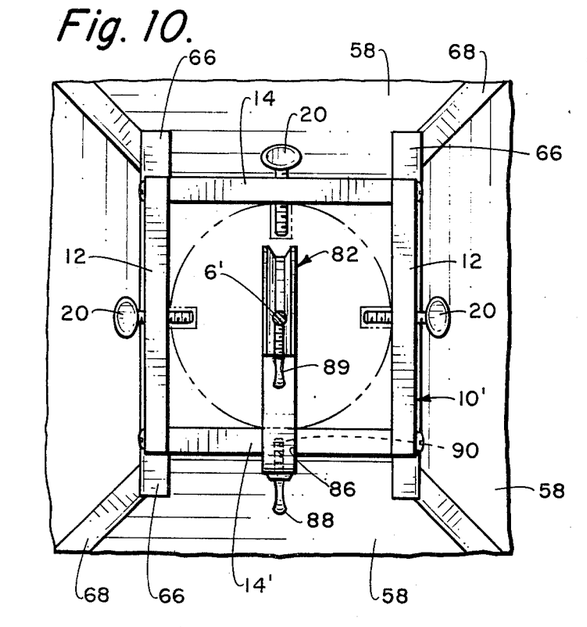
FIG. 10 is a view taken along the line 10—10 of FIG. 9.

The device 2 heretofore described, contemplates center reception of the elongate rod 6 but for association with, for example, light sources which cannot accommodate the elongate rod 6, for example, that shown in FIG. 9, the device 2' is provided. The elongate rod 6 is replaced with a shorter rod 6' which is received by hook-like support 82, retained by thumbscrew 89 and having the horizontal portion 84 received in a notch or slot 86 provided in first support member 10' and more specifically, the lower bar 14' and is retained in rigid securement thereto by means of threaded thumb-screw 88 being received into threaded bore 90, through the straight portion 84 of hook-shaped support member 82 and the threaded bore in bar member 14'. In all other respects the device 2' is identical to the device 2 heretofore explained with the exception of the changes and modifications heretofore mentioned incurred by the inability of the light source to receive an elongate rod.

Figures 12, 13:
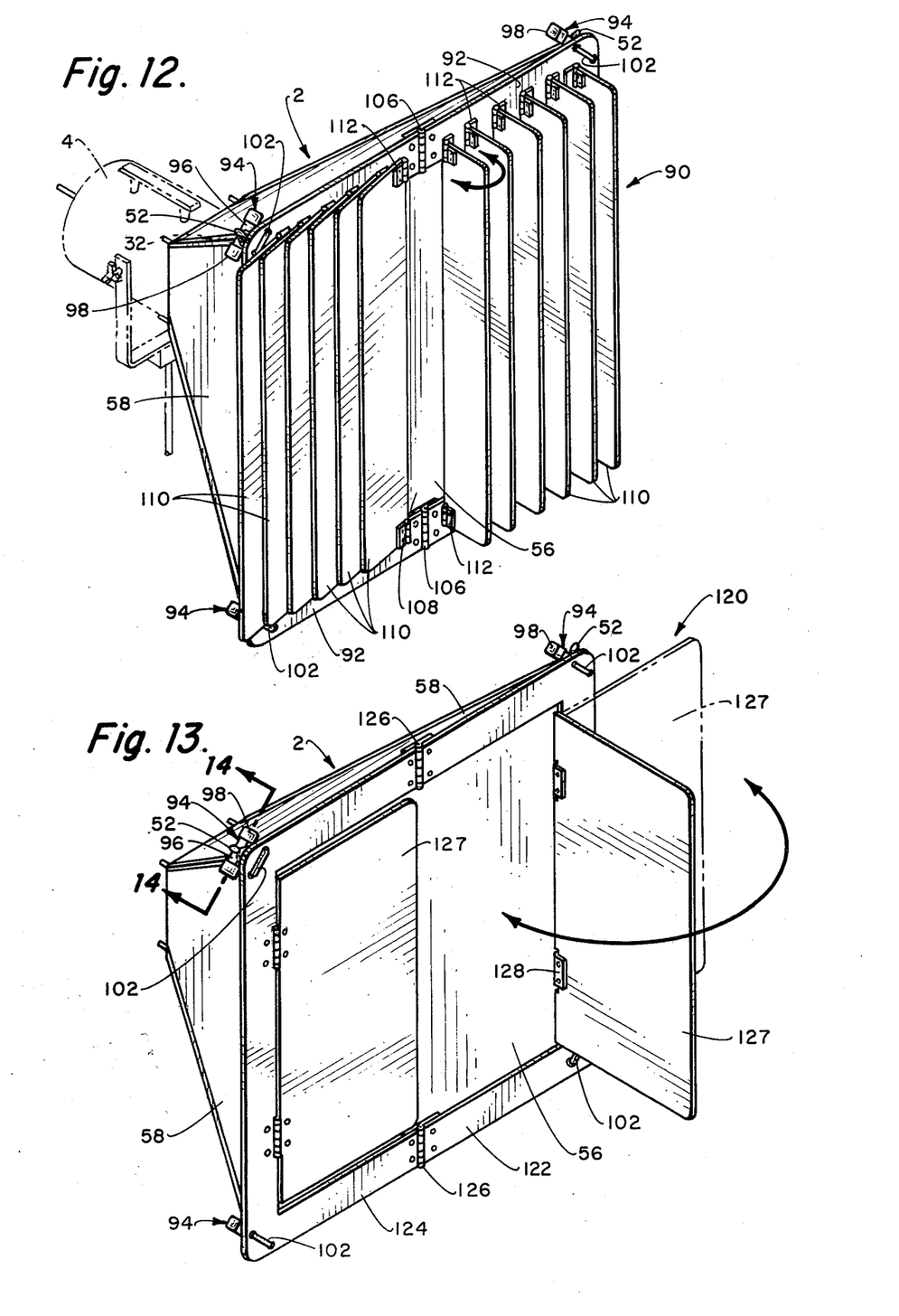
FIG. 12 illustrates a device of the invention combining the light diffuser with a shuttered light director and associated with a light source, like that shown in FIG. 8, being depicted in phantom.
FIG. 13 illustrates still another modification of the light diffuser device of this invention illustrating a dual shutter light director.

Referring now to FIG. 12 a light director attachment is illustrated which acts in combination with the device 2 to channel and direct light emanating from the front panel 56 produced by a light source 4. In this instance the light director 90 comprises a first rectangular frame member 92 provided with retention members 94 at each of its corners for association with the ray members 32 and more specifically the termini thereof.

The retaining members 94 (FIGS. 14, 15) comprise an elongated lightweight material bar 96 having end caps 98 and having an interior slotted configuration 100 to form a receiving groove for the ray 32 and wherein a elastomeric or rubber member 102 firmly anchored in the slots 104 provides friction holding means for retaining each of the corners of the director 90 to the rays 32 of device 2.

The light director 90 has the outer frame member 92 separated and hingedly connected as at 106 so as to make the light director 90 foldable and collapsible for ease of transportation. The central cut-out portion 108 of light director 90 is provided with a plurality of louver members 110 each hingedly connected through hinges at its top and bottom extremities as at 112 to the outer frame member 92 of light director 90. The outer frame element 92 as well as the individual louvers 110 of light director 90 are fabricated of a light-weight material and in this particular instance may be fabricated of a plastic, corrugated material which is somewhat stiff, sturdy, but yet, light-weight and preferably black in color so as to perform the light directing function for which light director 90 is intended. It is obvious that moving the left hand set of louvers as shown in FIG. 12 will serve to block light from that area whereas leaving the louvers 110 in the position shown to the right of FIG. 12 will allow more light to emanate from that portion of light director number 90.

Figures 14, 15, 17:
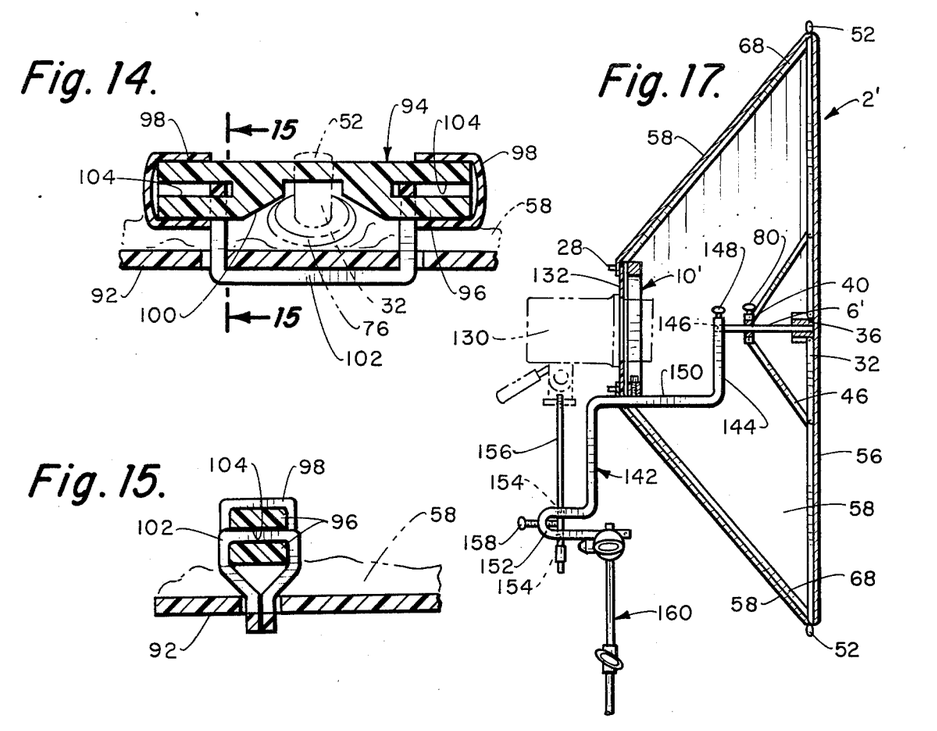
FIG. 14 is an enlarged, fragmented view taken along the line 14—14 of FIG. 13.
FIG. 15 is a view taken along the line 15—15 of FIG. 14.
FIG. 17 is a side, cross-sectional view in elevation of the device illustrated in FIG. 16.

Referring to FIG. 13 another type of light director is illustrated, again utilizing the same retaining members as previously described and as shown in FIG. 14. Herein the light director 120 comprises two outer border structures 122 and 124 hingedly connected at their mid-point as at 126 and in this instance having but two louvers 127 hingedly connected by their edges as at 128 so that the same lighting effects of a somewhat different quality may be obtained as previously described for light director 90 associated with device 2. The materials of construction for light director 120 preferably are those as previously described with regard to light director 90.

Referring now to FIGS. 16 and 17 a device 2' is illustrated for association with a tripod or stand-supported light source. In this instance, the light source 130 is of small design so that the lens of the light 130 would not completely fill the rectangular, central portion of first support member 10'. So that no stray light will be projected rearwardly of the light source 130, a template 132 is provided of light-weight material and preferably of corrugated plastic material having a plurality of perforations or scores thereby defining removable segments, for example, 134, 136 and 137, for cutting and removal to accommodate the particular size of lens or light source found in the field. In this instance, removal of the segment 134 provides ample accommodation for light source 130 and insures that most of the light emitted from light source 130 will be projected forwardly therefrom. The template 132 is rectangularly shaped having spaced apertures 138 to be received onto pins 28 of first support member 10' and is provided with a lower notch 140 so as to be snugly received in support structure as will be described.

The tripod of stand structure comprises a first member 142 having an upstanding portion 144 having an aperture 146 with threaded thumbscrew 148 to receive the rod 6' of device 2'. The horizontal run 150 is likewise provided with a threaded aperture not shown so as to receive first support member 10' in secure relationship. The remainder or lower portion of support member 142 is provided with a U-shaped portion 152 having spaced and aligned apertures 154 to receive rod member 156 which is releasably received in appropriate mounting brackets associated with light source 130 and which is rigidly retained in place by means of thumbscrew 158. The end of member 142 is received in appropriate and conventionally found stand or support structure 160 terminating in tripod-like legs not shown. It is thus seen that the light diffuser device of the invention is associable with light sources of various shapes and sizes.

Figure 19:
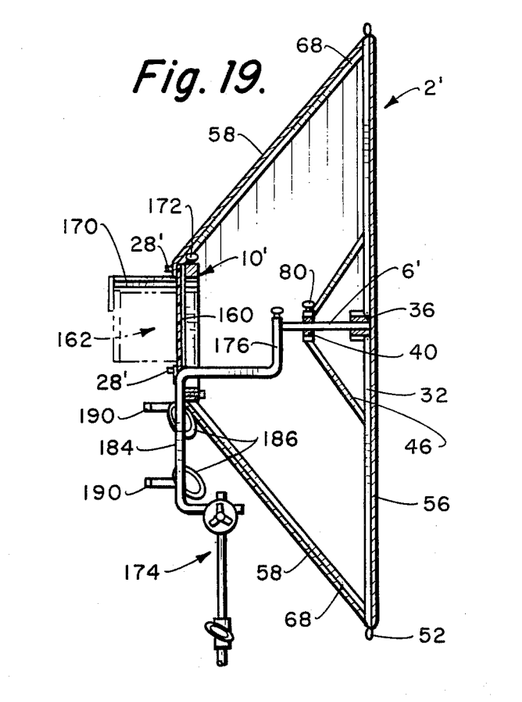
FIG. 19 is a side, partial cross-sectional view of the device illustrated in FIG. 18.

Referring now to FIGS. 18 and 19 there is illustrated the manner in which the device 2' is associated with still another and different type of light source having a rectangular configuration. In this instance a template 160 is provided having a plurality of scored portions which are detachable so as to accommodate the variously configured light sources in the marketplace such as, for example, 162 having two spaced rectangularly elements supported by a bayonet type of support structure 164. The scored segments 166 are removed from template 160 which is provided with spaced apertures 168 so as to accommodate pins 28' of first support member 10' in this instance modified by means of channels 170 secured to support member 10' by means of thumbscrews 172 or the like and of sufficient size to receive the bayonet type or handlebar support members 164 of strobe lighting source 162. The remainder of the support structure 174 serves the same function with regard to supporting by stand or tripod, not shown, the strobe light source 162 which is associated with the frame support frame member 10' wherein the support structure 174 has the upstanding vertical portion 176 with through hole 178 to receive elongated rod 6' of device 2'.

Figure 20:
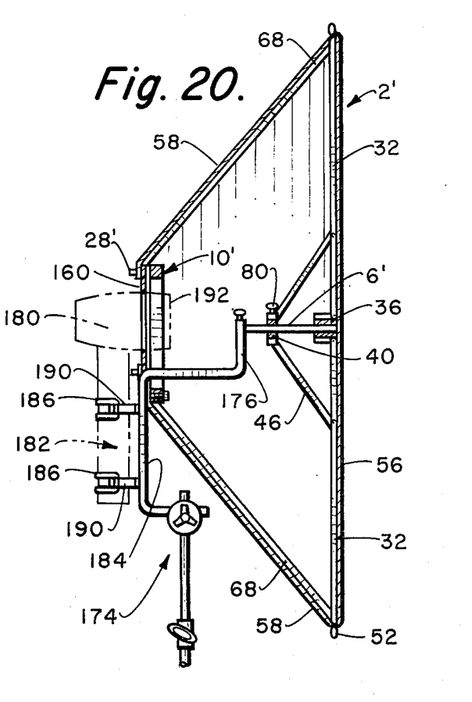
FIG. 20 is a view similar to that illustrated in FIG. 19 but illustrating association of the device of the invention with yet another light source.

Referring now to FIG. 20 there is illustrated the manner in which a different strobe or light source is supported in conjunction with the device 2'. Herein the light source 180 has a depending portion 182 which is secured to vertical portion 184 of support structure 174 by means of O-rings 186 which are elastomeric and co-act with positioned mounting receptacles 190 to receive the body 182 of the strobe or light source in which event the template as illustrated in FIG. 18 is only cut out so as to accommodate the oval face 192 of the light source 180. The template may be cut to any desired configuration to accommodate the various lighting source lens or housing shapes and such matters will make themselves obvious to those of ordinary skills in the art.

Figure 11:
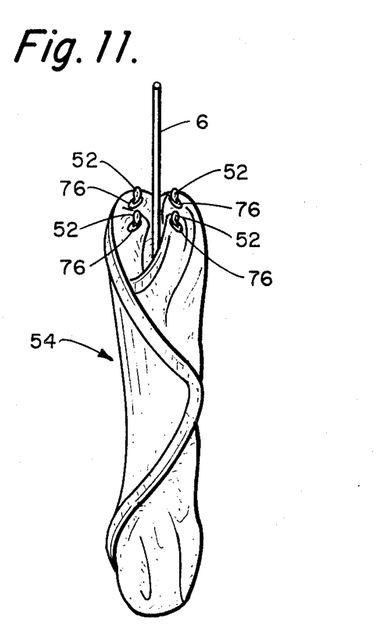
FIG. 11 illustrates the light diffuser device of the invention in the collapsed and easily transportable state.

The light diffusing and directing device 2 or 2' of the herein disclosed invention is provided with either an elongated rod 6 or 6' as previously described. The device 2, being provided with an elongated rod 6, is adapted to be center mounted from a lighting source as illustrated in FIGS. 1, 2 and 3 of the drawings. To utilize the device 2 in its collapsed state as shown in FIG. 11 the hub assembly having the affixed rays 32 and to which the light diffusing element 30 is affixed, is erected much like opening an umbrella to the position shown in either FIGS. 16 or 18, wherein the side panels 58 are unattached but the front panel 56 is attached to the rays 32 as previously described and so as to obtain substantial planar disposition of front panel 56 to stop pin 7 (FIG. 3) may be provided so as to engage the hub assembly 40 whereupon the thumbscrew 80 is rotated so as to rigidly secure the hub assembly in fixed position relative to the rod 6 or 6' as the case may be.

The first frame support member 10 may then be positioned and associated with a light source 4 as earlier described, with the pins 28 facing rearwardly thereof and subsequently the individual panels 58 erected, as shown in FIGS. 1, 2 and 3, by means of cooperation of the pins 28 and apertured holes 70 and the elongate rod 6 secured in the light source 4 as earlier described.

The individual fabric segments 56 and 58 are of dual layer construction and of lightweight fabric and the front panel 56 may be in opaque or translucent white fabric whereas the side panels 58 as earlier described, may have a black exterior layer 64 and a reflectorized interior surface 62 so as to obtain various indirect lighting effects utilizing the light source 4. To change the amount of directed light, one or more side panels 58 may be disengaged from the respective pins 28 and folded inwardly as shown in FIGS. 6 and 7. Obviously, to disassemble the device 2 or 2', the individual side panels 58 are all detached from the retaining pins 28 and folded inwardly, the thumbscrew 80 released, as well as the individual thumbscrews 20 holding the first frame support member 10 to the lighting source and thereafter the device 2 collapsed having released the elongate rod 6 from frictional retention by means of thumbscrew 8 of light source 4. Alternately, the light diffusing element 30 may be completely disassociated with the first frame support member 10 in which event, collapse of device 2 into the FIG. 11 position will be achieved. With the exception of the various mounting elements for other types of photographic lighting devices and strobes, the various devices illustrated in the figures of drawings will operate and function in the same mode as immediately described above.

To have the versatility of the light diffuser and light directing device for adaptation to variously configured light sources and strobes, the templates provided are lightly scored with various different configurations which a user of the devices of this invention will cut out to accommodate his specific needs to accommodate the specific light source involved. The material of construction of the templates as well as the further light directing devices for association with the devices 2 or 2' herein disclosed, make for a lightweight, easily carried and easily erectable, light diffuser and light directing device which fulfills a myriad of photographic needs.

Thus, there has been disclosed, light diffusing and light directing devices for association with various light sources and strobes used in the photographic industry, all of which fulfill a need which prior art devices have been unable to provide.

While the devices of the invention have been specifically described with regard to specific materials of construction and specific configurations, those of ordinary skill in the art will at once recognize certain changes and modifications, all of which will not depart from the spirit and essence of the invention and all such changes, modifications and alternatives, are intended to be included in the appended claims.

I claim:

1. In a light diffuser and light director, the combination comprising: a first frame support member adapted for association with a photographic light source; a second frame support member spaced from said first frame support member and comprising a plurality of collapsible rays extending from a central hub means for movement into a collapsed position and erect position; a light diffusing and directing member defining one or more light diffusing and directing segments, detachably supported from and forming at least a front wall and at least one sidewall between said first and second frame support members; the termini of said plurality of rays opposite said hub means being adapted to receive the front wall forming segment of said light diffusing and directing member outwardly from a light source with which said light diffuser and director is adapted to be associated.

2. The light diffuser and director in accordance with claim 1, wherein said hub means comprises two spaced hubs, one hub having an elongate rod rigidly secured thereto and the other hub being slideably disposed on said elongate rod.

3. The light diffuser and director in accordance with claim 2, wherein each of said plurality of rays are pivotally secured to said one hub and each has a pivotally secured brace member pivotally secured to said other hub.

4. The light diffuser and director in accordance with claim 3, wherein said light diffusing member comprises lateral truncated-triangular segments of conformable panels, with each corner having apertures therein for engaging retention in association with said first and second frame support members and a front panel for defining a wall forward of said light source.

5. The light diffuser and director in accordance with claim 4, wherein said first and second frame support members define a truncated pyramid when said light diffusing and directing member has its lateral segments mounted to form sidewalls.

6. The light diffuser and director in accordance with claim 5, wherein four rays are supported from said central hub means and said first frame support member is rectangular in configuration, having extending pins at each corner to receive the short side of said truncated-triangular segment.

7. The light diffuser and director in accordance with claim 6, wherein said front panel is rectangular in configuration.

8. The light diffuser and director in accordance with claim 7, wherein the length of said linear rod is sufficient for mechanical association with said light source.

9. The light diffuser and director in accordance with claim 8, wherein said elongate rod is supported from said first frame support member.

10. The light diffuser and director in accordance with claim 8, wherein said conformable panels are of two ply construction with each of the plies having different light reflective characteristics.

11. The light diffuser and director in accordance with claim 10, wherein said one hub has a plurality of spaced projections corresponding in number to said rays and said rays are pivotally secured to said projections.

12. The light diffuser and director in accordance with claim 11, wherein said other hub has a plurality of spaced projections corresponding in number to said projections on said one hub and said brace members are secured to each of said projections on said other hub.

13. The light diffuser and director in accordance with claim 12, wherein said elongate rod is provided with a stop pin to limit movement along said rod of said other hub slideably disposed on said elongate rod.

14. The light diffuser and director in accordance with claim 13, wherein said other hub is provided with a stop means for frictionally engaging said elongate rod and to rigidly secure said other hub thereto in a releasable manner.

15. The light diffuser and director in accordance with claim 14, wherein the perimetric edges of said light diffusing segments are reinforced with a fabric layer.

16. The light diffuser and director in accordance with claim 15, wherein the short edges of said truncated-triangular segments are provided with spaced reinforced apertures.

17. The light diffuser and director in accordance with claim 9, wherein said first frame support member is rectangularly shaped and the lower portion thereof is notched to receive an elongate rod supporting member to support said elongate rod in secure fashion.

18. The light diffuser and director in accordance with claim 17, which additionally includes a template member for association with said first frame support member and being adapted for excision for the formation of an aperture to follow the contours of said photographic light source.

19. The light diffuser and director in accordance with claim 18, wherein said template member is of lightweight construction and is fabricated of thin-walled, corrugated plastic.

20. A photographic light diffuser and director comprising the combination: a first frame support member adapted for releasable rigid attachment to a photographic light source; a second frame support member supportively secured in spaced relationship to said first frame support member; a conformable light diffusing and directing member supported from said first and second frame support members and defining a light chamber having side walls of selectable disassociatable nature, and means to releasably retain said light diffusing and directing member on said first and second frame support members.

21. The device in accordance with claim 20 wherein said second frame support member is adapted for positioning in a collapsed or erect state.

22. The device in accordance with claim 21 wherein said second frame support member comprises spaced first and second hub structures, said first hub having an elongate rod secured centrally thereof and extending through said second hub, said first hub having a plurality of spaced rays pivotally secured thereto, said second hub having a plurality of braces corresponding in number to said plurality of rays and each of said braces being pivotally connected to said second hub and each one of said plurality of rays, said second hub being slideably disposed on said elongate rod.

23. The device in accordance with claim 22 wherein said first frame support member has a plurality of spaced receiving pins disposed rearwardly thereof.

24. The device in accordance with claim 23 wherein said first frame support member has a plurality of spaced retaining means for releasably retaining same in association with a photographic light source.

25. The device in accordance with claim 24 wherein said conformable light diffusing and directing member is comprised of fabric segments, one segment being rectangular and adapted to form the front wall of said light chamber and having four truncated-triangular shaped segments secured adjacent each side of the rectangle.

26. The device in accordance with claim 25 wherein the short edge of each of said four truncated-triangular shaped segments is provided with retaining means for retention on said securing pins of said first frame support member.

27. The device in accordance with claim 26 wherein each corner of the rectangularly shaped segment of said light diffusing and directing member is provided with retaining means to be received by each of the rays of said plurality of rays and to be supported in stretched fashion thereon.

28. The device in accordance with claim 27 wherein said rectangularly shaped segment is of translucent fabric material.

29. The device in accordance with claim 28 wherein each of said triangular-truncated segments is fabricated of a double ply of material, one ply being light reflective and the other light absorptive.

30. The device in accordance with claim 29 wherein said retaining means comprise reinforced apertures.

31. The device in accordance with claim 30 wherein the edges of each of the segments forming said conformable light diffusing and directing member have reinforced borders.

32. The device in accordance with claim 31 wherein said elongate rod is provided with a stop pin intermediate said first and second hub to axially limit the movement of said second hub towards said first hub.

33. The device in accordance with claim 32 wherein the ends of each of said plurality of rays opposite said first hub are notched for ease of retention of said apertures in said rectangularly shaped segment.

34. The device in accordance with claim 33 wherein said elongate rod is of sufficient length to be securely positioned through a photographic light source.

35. The device in accordance with claim 33 wherein said elongate rod is releasably supported from said first frame support member and including stand means to support said device from a plane in combination with a photographic light source.

36. The device in accordance with claim 20 including a template member for accommodating the geometry of the photographic light source with said first frame support member.

37. The device in accordance with claim 36 wherein said template is supported from said first frame support member.

38. The device in accordance with claim 20 including light blocking means mountable on said second frame support member.

39. The device in accordance with claim 38 wherein said light blocking means is of flat, thin wall, lightweight construction and has at least two shutters hingedly supported from opposed edges for pivotal movement away from and overlying the front wall of said light chamber.

40. The device in accordance with claim 39 wherein said light blocking means comprises two border elements hingedly connected to each other for knocked down, collapsed and adjacent positioning relative to each other.

41. The device in accordance with claim 40 wherein said second frame support member comprises spaced first and second hub structures, said first hub having an elongate rod secured centrally thereof and extending through said second hub, said first hub having a plurality of spaced rays pivotally secured thereto, said second hub having a plurality of braces corresponding in number to said plurality of rays and each of said braces being pivotally connected to said second hub and each one of said plurality of rays, said second hub being slideably disposed on said elongate rod.

42. The device in accordance with claim 41 wherein said light blocking means is rectangular in configuration and each of the corners thereof are provided with retaining means for mounting thereof on the termini of each of the rays of said plurality of rays.

43. The device in accordance with claim 42 wherein said retaining means comprise elastic loop members for securing each of the corners of said light blocking means to the ends of said rays opposite said first hub.

44. The device in accordance with claim 43 wherein a plurality of shutters are mounted to opposite edges of said border elements and are adapted to overlap each other.

45. The device in accordance with claim 44 wherein said plurality of shutters and border elements are fabricated of lightweight corrugated plastic.

* * * * *